United States Patent
Brasetvik et al.

(10) Patent No.: US 11,108,857 B2
(45) Date of Patent: Aug. 31, 2021

(54) SELF-REPLICATING MANAGEMENT SERVICES FOR DISTRIBUTED COMPUTING ARCHITECTURES

(71) Applicant: Elasticsearch B.V., Mountain View, CA (US)

(72) Inventors: Alex Brasetvik, Oslo (NO); Njal Karevoll, Voss (NO)

(73) Assignee: Elasticsearch B.V., Amsterdam (NL)

( * ) Notice: Subject to any disclaimer, the term of this patent is extended or adjusted under 35 U.S.C. 154(b) by 7 days.

(21) Appl. No.: 15/907,011

(22) Filed: Feb. 27, 2018

(65) Prior Publication Data
US 2019/0268408 A1    Aug. 29, 2019

(51) Int. Cl.
*G06F 15/16*    (2006.01)
*H04L 29/08*    (2006.01)
*H04L 9/32*    (2006.01)
*H04L 29/06*    (2006.01)

(52) U.S. Cl.
CPC ........ *H04L 67/1095* (2013.01); *H04L 9/3213* (2013.01); *H04L 9/3226* (2013.01); *H04L 67/42* (2013.01)

(58) Field of Classification Search
CPC .............. H04L 29/06; H04L 29/08072; H04L 67/1095; H04L 67/42; H04L 9/3213; H04L 9/3236
USPC ................................ 709/220, 224, 227, 228
See application file for complete search history.

(56) References Cited

U.S. PATENT DOCUMENTS

| | | | |
|---|---|---|---|
| 6,401,120 B1 | 6/2002 | Gamache et al. | |
| 7,024,450 B1 | 4/2006 | Deo et al. | |
| 7,130,807 B1 * | 10/2006 | Mikurak | G06Q 10/06 705/7.25 |
| 7,363,362 B1 | 4/2008 | Friedman et al. | |
| 8,452,956 B1 * | 5/2013 | Kersey | H04L 63/10 713/153 |
| 8,732,023 B2 * | 5/2014 | Mikurak | G06Q 50/12 705/22 |
| 9,703,890 B2 * | 7/2017 | Kakaraddi | G06F 11/3604 |

(Continued)

FOREIGN PATENT DOCUMENTS

WO    WO2019168623 A1    9/2019

OTHER PUBLICATIONS

"International Search Report" and "Written Opinion of the International Searching Authority," Patent Cooperation Treaty Application No. PCT/US2019/015649, dated Apr. 24, 2019, 9 pages.

(Continued)

*Primary Examiner* — Khanh Q Dinh
(74) *Attorney, Agent, or Firm* — Carr & Ferrell LLP

(57) ABSTRACT

Self-replicating management services for distributed computing architectures are provided herein. An example system method includes providing one or more nodes providing services; maintaining a quorum of a plurality of management servers by: providing at least a distributed coordination service for the one or more nodes on each of the plurality of management servers, the distributed coordination service being a datastore; managing, via a director, requests for data on the distributed coordination service from the one or more nodes; and promoting at least one of the one or more nodes to being one of the plurality of management servers, wherein promoting comprises replicating the distributed coordination service thereon.

18 Claims, 4 Drawing Sheets

(56) References Cited

U.S. PATENT DOCUMENTS

| | | | |
|---|---|---|---|
| 10,326,769 B2* | 6/2019 | Ilieva | G06F 16/284 |
| 11,019,166 B2 | 5/2021 | Dodson | |
| 2006/0092861 A1 | 5/2006 | Corday et al. | |
| 2009/0327817 A1* | 12/2009 | Iyengar | G06F 16/2308 |
| | | | 714/48 |
| 2010/0058054 A1* | 3/2010 | Irvine | H04L 63/08 |
| | | | 713/165 |
| 2010/0064354 A1* | 3/2010 | Irvine | G06F 21/6218 |
| | | | 726/5 |
| 2012/0089410 A1* | 4/2012 | Mikurak | G06Q 30/0225 |
| | | | 705/1.1 |
| 2012/0259722 A1* | 10/2012 | Mikurak | G06Q 50/12 |
| | | | 705/26.1 |
| 2014/0222610 A1* | 8/2014 | Mikurak | G06Q 30/0633 |
| | | | 705/26.5 |
| 2015/0074670 A1* | 3/2015 | Gerganov | G06F 9/5027 |
| | | | 718/103 |
| 2015/0134606 A1* | 5/2015 | Magdon-Ismail | G06F 16/27 |
| | | | 707/610 |
| 2015/0222444 A1* | 8/2015 | Sarkar | H04L 12/1877 |
| | | | 370/390 |
| 2016/0043903 A1 | 2/2016 | Jaisinghani | |
| 2016/0092952 A1* | 3/2016 | Forbes | G06Q 10/0631 |
| | | | 705/7.21 |
| 2016/0098324 A1* | 4/2016 | Sugabrahmam | G06F 9/50 |
| | | | 714/6.23 |
| 2016/0110434 A1* | 4/2016 | Kakaraddi | G06F 11/3006 |
| | | | 707/602 |
| 2016/0378518 A1* | 12/2016 | Antony | G06F 9/4856 |
| | | | 718/1 |
| 2018/0067736 A1 | 3/2018 | De Zaeytijd et al. | |
| 2018/0114000 A1* | 4/2018 | Taylor | G06F 21/12 |
| 2018/0260125 A1* | 9/2018 | Botes | G06F 3/0617 |
| 2019/0268431 A1 | 8/2019 | Brasetvik et al. | |
| 2020/0117637 A1 | 4/2020 | Roy et al. | |
| 2020/0328952 A1 | 10/2020 | Makwarth et al. | |
| 2021/0176328 A1 | 6/2021 | Brasetvik et al. | |

OTHER PUBLICATIONS

Georgiadis, Ioannis et al., "Self-Organising Software Architechtures for Distributed Systems," Proceedings of the first workshop on Self-Healing Systems, ACM Nov. 19, 2002 [retrieved Apr. 1, 2019]; Retrieved from the internet (http://www.cs.cmu.edu/~garlan/17811/Readings/p33-georgiadis.pdf>, 6 pages.

* cited by examiner ically to distributed computing, and more specifically, but not by limitation, to self-replicating management services for distributed computing architectures.

SELF-REPLICATING MANAGEMENT SERVICES FOR DISTRIBUTED COMPUTING ARCHITECTURES

CROSS REFERENCE TO RELATED APPLICATIONS

N/A

FIELD OF THE PRESENT TECHNOLOGY

The present technology relates generally to distributed computing, and more specifically, but not by limitation, to self-replicating management services for distributed computing architectures. In some instances, these management services can self-replicate from nodes operating in the computing architecture in order to maintain redundancy and data integrity.

SUMMARY

Various embodiments of the present technology include a system comprising: one or more nodes providing services; and a plurality of management servers, each of the plurality of management servers comprising: at least a distributed coordination service for the one or more nodes, the distributed coordination service being a datastore; and a director that manages the distributed coordination service, wherein the director is configured to: manage requests for data of the distributed coordination service from one or more nodes; and promote at least one or more nodes to being one of the plurality of management servers, wherein promoting comprises replicating the distributed coordination service thereon.

In some embodiments, the coordination service incorporates a datastore, and the director is a sidecar to the coordination service and manages aspects of the coordination service such as lifecycle.

Various embodiments of the present technology include a method comprising: providing one or more nodes providing services; and maintaining a quorum of a plurality of management servers by: providing at least a distributed coordination service for the one or more nodes (where the distributed coordination service is a datastore) on each of the plurality of management servers; managing, via a director, requests for data on the distributed coordination service from the one or more nodes; and promoting at least one of the one or more nodes to being one of the plurality of management servers, wherein promoting comprises replicating the distributed coordination service thereon.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
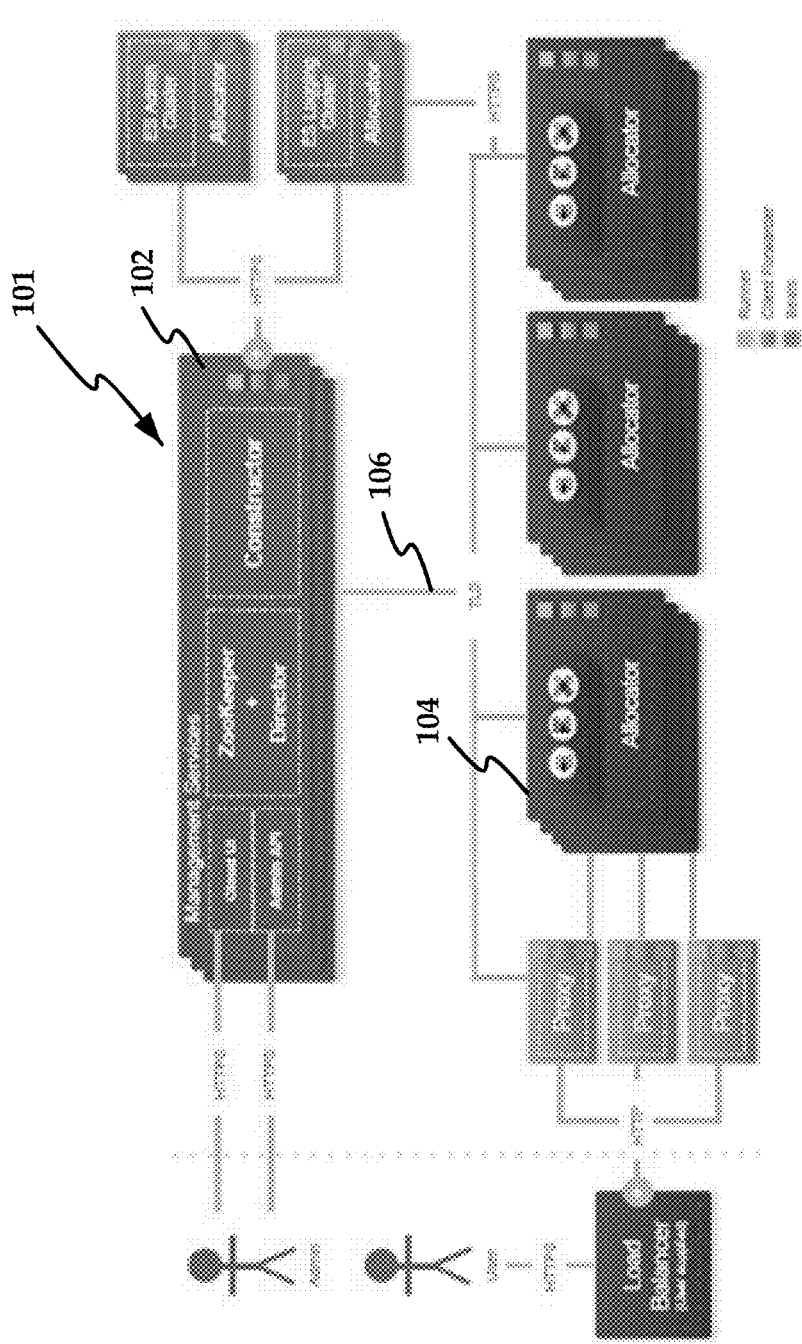
FIG. 1 is a high level schematic diagram of computing architecture for practicing aspects of the present technology.

The present disclosure is directed to various embodiments of systems and methods that comprise self-replicating management services for distributed computing architectures. In some instances, these management services can self-replicate using nodes operating in the computing architecture in order to maintain redundancy and data integrity.

Prior to additional discussion, some definitions are provided for context. A datastore as referred to herein is a distributed coordination service that acts as a datastore. The datastore in the coordination service is what is used to configure and govern other services. Its ability for its management to be automated and its resiliency in the face of failures is what makes a datastore useful as a coordination service. ZooKeeper, as used herein is an example of a coordination service, and specifically Apache ZooKeeper™. The present disclosure provides a director that manages a coordination service, such as ZooKeeper™. Stunnel is a particular product used to establish cryptographic tunnels (e.g., encryption infrastructure). A cryptographic tunnel is useful when the product that needs securing either has no or poor support for cryptographic features.

Operations performed by a director/client forwarder of the present disclosure happen to be interacting with stunnel, but a "tunnel" product is not required or necessary if the underlying system possesses acceptable cryptographic support.

Ports (e.g., client ports) as referred to herein, specifically such as a client port that is a feature of ZooKeeper™. The systems of the present disclosure adapt to ZooKeeper™ in this context. If a different coordination service (e.g., not ZooKeeper™) is utilized which has a better separation of privileged users, separate ports may not be required.

A Blueprinter is a distributed workload scheduler and schedules workloads based on roles that can be dynamically managed at runtime. A function of the Blueprinter in context of the director is to act as a gatekeeper that verifies tokens, providing a means of automatically providing credentials such as certificates, private keys and authentication without human approval.

In some embodiments, a distributed computing architecture such as the Elastic Cloud Enterprise™ is managed and implemented with self-replicating management services. Elastic Cloud Enterprise™ is a distributed computing architecture that is located on premises at a customer site or hosted remotely.

In general, the self-replicating management services are mediated using components such as a self-replicating management services. The coordination service implements a database that stores data for the distributed computing architecture. Operations and access to the coordination service are mediated through a director. The self-replicating nature of these systems is also facilitated through use of the director.

In some embodiments, the coordination service coordinates a state of the distributed computing architecture and a state of all clusters (e.g., nodes or allocators) executing within the distributed computing architecture. In some instances, a coordination service is managed by one or more directors.

In various embodiments, an instance of coordination service and director run on a management server (which could be physical or virtual). In one or more embodiments, the management server can be self-replicating through recruitment or promotion of nodes within the distributed computing architecture. According to some embodiments, the directors ensure that a quorum of management servers is available. In some embodiments a quorum is at least three management servers. In some embodiments a quorum is at least two out of three management servers. Other quorum and totals numbers of management servers are also contemplated.

The management servers are all synchronized and interconnected, in some embodiments. That is, the database (e.g., coordination service) is replicated and each management server is connected to every other management server in the architecture. In sum, the directors are involved in establishing a quorum when new coordination service nodes are created. New directors are also instantiated on the new nodes as well.

In some embodiments, the directors can be configured to establish not only a quorum of management servers, but the directors can also promote and establish a pool of inactive but pre-configured management servers. Upon detection of a failure in one of the management servers currently in a quorum, the directors can automatically select from these pre-configured management servers rather than having to wait until a quorum failure is detected in order to promote a new node. Failure to rectify a lack of quorum in management servers leads to deleterious downstream effects such as data unavailability, which results in the nodes being unable to provide services to their end users.

In some embodiments, the directors sign CSRs (certificate signing requests) for nodes that want to communicate with a coordination service. The directors also maintain the encryption infrastructure used by coordination services for communication inside the architecture. These and other advantages of the present disclosure are provided herein.

FIG. 1 is a schematic diagram of an example system that includes a plurality of management servers 101, such as management server 102 and one or more nodes such as node 104 (e.g., allocator). The management server 102 and node 104 are communicatively coupled over an encrypted infrastructure (e.g., secure communications channel) 106 such as an S-Tunnel, for example. In general, administrators can access the functions of the management server 102 and end users can access services executing on the node 104.

Figure 2:
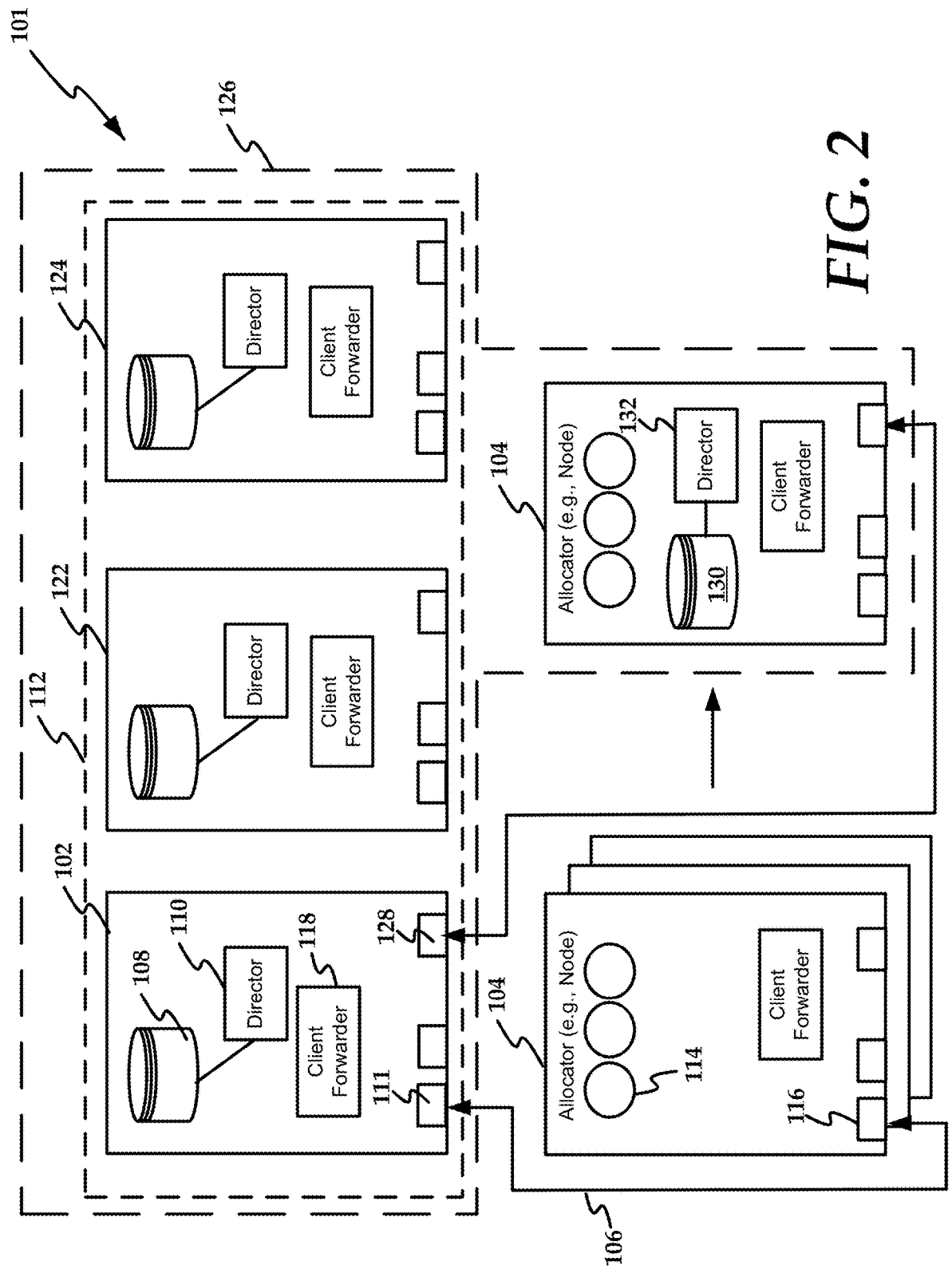
FIG. 2 illustrates a self-replicating, node promotion process within a distributed computing architecture.

In more detail, each of the management servers comprises a distributed coordination service 108 (e.g., coordination service) and director 110, each of which are disclosed in greater detail with respect to FIG. 2.

Turning to FIG. 2, the management server 102 (of a plurality of management servers) is illustrated as comprising the distributed coordination service 108 and the director 110. The distributed coordination service 108 is implemented as a datastore, in some embodiments. The distributed coordination service 108 maintains the data necessary to allow the node 104 to provide various services to end users. For example, node 104 can provide one or more services to end users such as a visualization tool, data shippers, data log pipeline, and so forth.

In general, the director 110 is configured to manage requests for data on the datastore from the node 104 and promote one or more nodes (such as node 104 for example) to being one of the plurality of management servers. Generally speaking, promoting comprises replicating the distributed coordination service 108 and the datastore thereon. A new director is also spun up on the node 104 during promotion.

For context, the director 110 is a sidecar to the distributed coordination service 108 that performs several functions. In some instances, the director 110 maintains a lifecycle of the distributed coordination service 108. The director 110 can write distributed coordination service 108 configuration files (as well as guarantee uniqueness of the management server identifiers) and schedule a management server to start locally (if no nodes are available to promote). The director 110 can also handle promotion of a node from observer to participant once all the data in the distributed coordination service of one management server is replicated to the node and has been guaranteed to be synchronized from the existing ensemble of management servers.

The director 110 also maintains an encryption infrastructure (e.g., secure communications channel) configurations for distributed coordination service 108 server ports (inbound and outbound, referred to as a management interface), and client ports (all discussed in more detail below), using a server-specific and a client-specific schema. This provides transparent (from the distributed coordination service of view) encryption of traffic between the management servers.

In FIG. 2, an initial set of management servers in a quorum 112 is present. The director 110 of management server 102 begins a process of promoting the node 104. This can occur when the node 104 requests access to the distributed coordination service 108. For example, in order to execute a service 114 of the node 104, the node 104 requests data from the distributed coordination service 108. In some embodiments, this is effectuated by the node 104 connecting to a node port 116 on the management server 102. Initially, the node 104 is a non-trusted server/entity.

When the node 104 requests access to the distributed coordination service 108, the node 104 will provide the director with a CSR request. If approved, the director 110 will sign the CSR request and set up the encryption infrastructure 106 between the management server 102 and the node 104 on a node interface 111 of the management server 102. The node 104 is now trusted and can be allowed to request data from the distributed coordination service 108. In some embodiments all connections between management servers and nodes include encryption infrastructure, as well as connections between management servers and other management servers.

If the director 110 determines that a new management server is required, the director 110 can initiate a process of promoting the node 104 to management server status. This preemptive promotion can be based on the fact that a quorum of management servers is present, but that loss of one of these management servers would result in a quorum failure. For example, management servers 102, 122, and 124 are present and form the quorum 112. Again, while not illustrated for purposes of clarity, each of the management servers 102, 122, and 124 are interconnected to one another. These management servers 102, 122, and 124 are connected on a dedicated management interface 128 that allows unrestricted access to the underlying datastore (e.g., coordination service). Thus, while the node facing ports provide only limited access to data, the dedicated management interface provides complete access to the data on the coordination service.

In addition to interconnection between instances of distributed coordination services on different management servers through their respective dedicated management interfaces, the director of each management server is coupled with the directors and distributed coordination services of all other management servers in the quorum.

Due to the fact that three management servers are needed for a quorum (in some embodiments fewer or more), the director of the management server 102 automatically initiates promotion of node 104 to management status. In other words, three management servers are desired so as to allow for surviving the failure of one management server.

The selection of node 104 is undertaken because node 104 is already a trusted node. Thus, the automatic promotion of nodes can be based on threshold criteria related to the quorum. It will also be understood that any of the management servers is capable of automatically promoting a node, although directors on the various management servers can coordinate so as to not promote additional management servers if another director has already initiated a promotion process. An expanded quorum 126 is illustrated in FIG. 2, as now including node 104.

The node 104 now includes a distributed coordination service 130 and a director 132. In some embodiments, the director 110 of the management server 102 writes distributed coordination service configuration files onto the node 104 in such a way that a uniqueness of an identification of the distributed coordination service is maintained. Thus, the distributed coordination service of the management server 102 is replicated onto the node 104. The director 110 of the management server 102 can also verify that replication of the distributed coordination service on the node 104 has resulted in synchronization with the distributed coordination service of each of the plurality of management servers in the quorum.

Once the node 104 is promoted to the management server status, the node 104 is capable, through its director 132, of promoting other nodes if needed.

In one or more embodiments, a director can facilitate promotion of a node by issuing certificates node that desires to connect to any of the plurality of management servers and granting access to certificate bearing nodes on the one or more client ports.

In some embodiments, the director can implement a blueprinter function that assigns nodes in the cloud the management servers based on a role associated with the one or more nodes. That is, a particular management server can be dedicated to service a specific type of node/client. The management server is thus assigned this type or role. Nodes requiring data from the management server can be assigned based on a role.

The blueprinter, acting as a workload scheduler in a distributed system, can also dynamically reassign a node to a different management server when the role of the node changes or a role of a currently assigned management server is changed. For example, if a node is performing a visualization role, the management server is associated with a visualization role.

In some embodiments, the blueprinter is configured to ensure that automatically assigned management server relationships do not conflict with manually assigned management server relationships. For example, if an administrator has manually set up a relationship between a node or nodes and a management server or management servers.

In sum, given a set of containers associated with a role, the blueprinter ensures these containers are assigned to servers based on the roles the servers have. The container assignments are updated dynamically if either the role definitions change or the roles of server change. The roles associated with a server can be authenticated either through an administrator explicitly validating the server for the roles or through a token-based system where the server supplies a token that the blueprinter can cryptographically verify as valid and untampered. It will be understood that care is taken to ensure that the automatically assigned containers management do not conflict with manually assigned containers in such a way that a manually assigned container will not be removed from a server as part of the blueprinter operations.

Additional enhancements to the processes described above are also disclosed. For example, when a client forwarder 118 implemented on the management server 102 to cooperate with the director 110 to forward a known set of local ports (e.g., node or client ports) and transparently handle encryption of traffic and automatically update the forwarded ports to new management servers when any of the directors of the management servers in a quorum are unavailable.

In various embodiments, the client forwarder 118 is configured to cooperate with the director 110 and forward a known set of local ports on each server in an installation to potentially remote distributed coordination service APIs, transparently handle encryption over the network, and automatically update forwarded ports when directors are added/ removed from an installation.

Another advantage includes the use of tokens for security and rapid integration of new servers. For example, the replication process of creating a new node and promoting the node to management server status can be optimized through use of a token. For example, if a node needs to be terminated, the end user of the node can request a token that includes the configurations of that particular node, which include trusted status or permissions for that node. When a new node is created, the node can be provisioned with the token. The new node can present the token to a director of a currently existing management node in order to automate the certificate exchange processes and trust verification steps disclosed above.

Also, the token can identify the new node as a management node. That is, the prior role of the node was a management server. These configurations are set forth in the token such that when the new node can present the token to a director of a currently existing management node and be promoted without having to complete the certificate exchange processes and trust verification steps. In some embodiments, the certificate is still issued and the token is used to automate the certificate provisioning without having to await approval.

Figure 3:
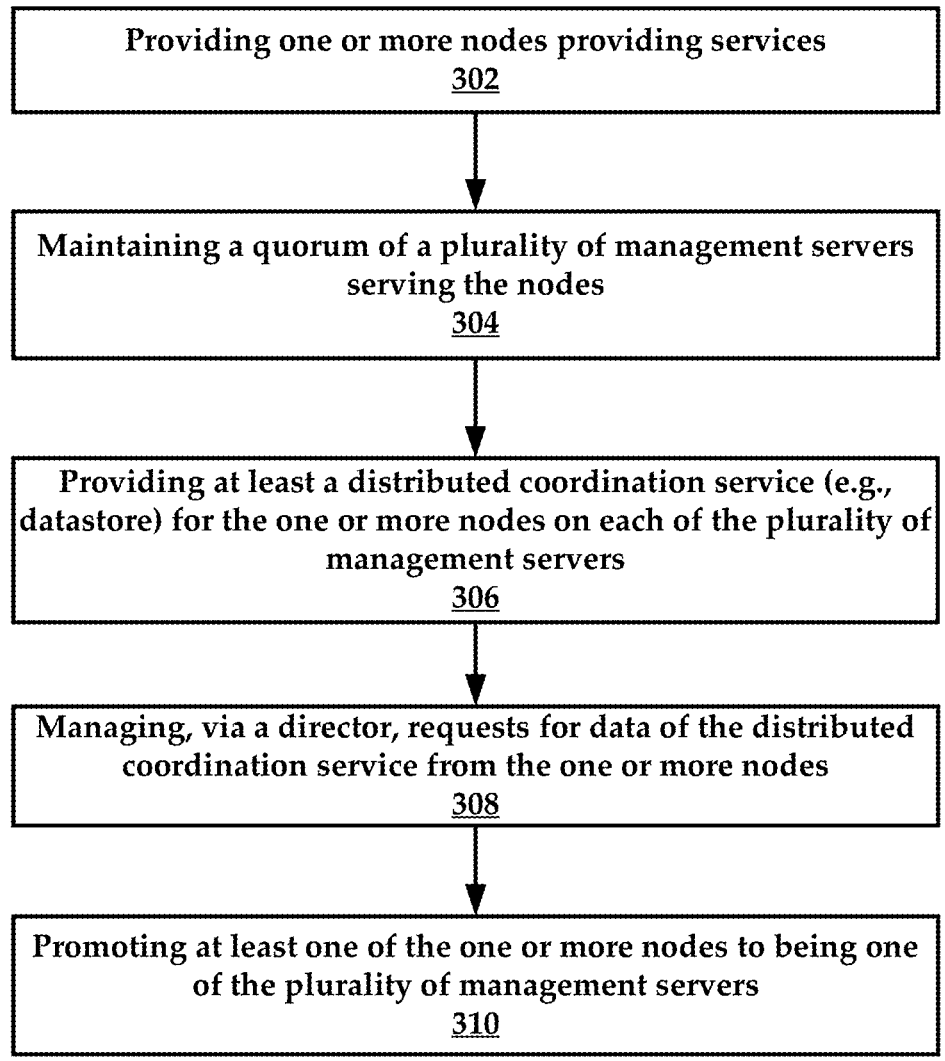
FIG. 3 is a flowchart of an example method of the present disclosure.

FIG. 3 is a flowchart of an example method that is executed in accordance with the present disclosure. The method includes a step 302 of providing one or more nodes providing services. For example, the network includes one or more nodes that provide services such as data visualization, data transfer, and data logging to end users. These node(s) are maintained by management servers in the architecture. Thus, the method also includes a step 304 of maintaining a quorum of a plurality of management servers serving the nodes. These management servers mediate the flow of data within the architecture to the node(s). The management servers also function to promote nodes if needed to ensure that a quorum of management servers is present.

The method can also include a step 306 of providing at least a distributed coordination service for the one or more nodes on each of the plurality of management servers. This distributed coordination service stores the data needed for the nodes to provide their respective services to end users.

In some embodiments, the method includes a step 308 of managing, via a director, requests for data on the coordination service from the one or more nodes. This includes the director mediating interactions for data from nodes into the distributed coordination service, ensuring that access to the distributed coordination service is efficient and simple.

In one or more embodiments, the method includes a step 310 of promoting at least one of the one or more nodes to being one of the plurality of management servers. To be sure a promoting process comprises replicating the distributed coordination service (and its underlying datastore) in the node being promoted. When the replication has been validated and the newly promoted management server has been synchronized to all other management nodes in the quorum, the node is considered to be part of the quorum.

Figure 4:
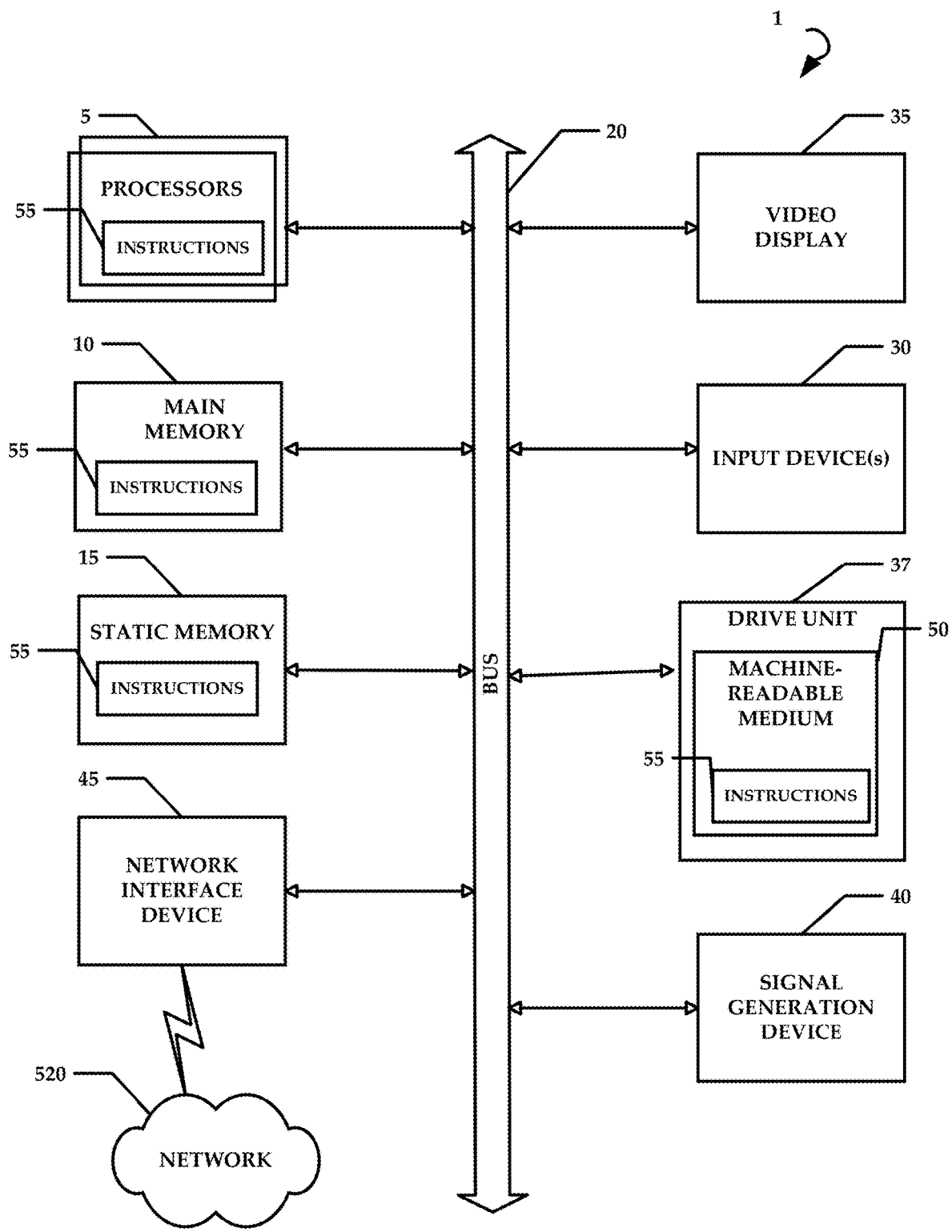
FIG. 4 is a diagrammatic representation of an example machine in the form of a computer system.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 150 or network 520, see FIG. 1 and FIG. 4, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system comprising:
  one or more nodes providing services; and
  a plurality of management servers, each of the plurality of management servers comprising:
    at least a distributed coordination service for the one or more nodes, the distributed coordination service including a datastore for configuring the services; and
    a director that manages the distributed coordination service, the director being configured to:

manage requests for data of the distributed coordination service from the one or more nodes;

selectively promote at least one of the one or more nodes to being one of the plurality of management servers based on a threshold of trust for the one or more nodes to maintain a quorum of the plurality of management servers, wherein promoting comprises replicating the distributed coordination service and starting a new director on the at least one of the one or more nodes; and wherein the director is further configured to maintain secure tunnels between the plurality of management servers and the one or more nodes providing services, an encryption infrastructure providing transparent encryption of traffic.

2. The system according to claim 1, wherein the at least one of the one or more nodes that was promoted to being one of the plurality of management servers is also configured to promote at least one of the one or more nodes to being one of the plurality of management servers.

3. The system according to claim 1, wherein a number of the one or more nodes promoted by the director is based on a server quorum value.

4. The system according to claim 1, wherein the director is further configured to write distributed coordination service configuration files in such a way that a uniqueness of an identification of the distributed coordination service is maintained.

5. The system according to claim 1, wherein the director is further configured to verify that replication of the distributed coordination service on the at least one of the one or more nodes has resulted in synchronization with the plurality of management servers.

6. The system according to claim 1, wherein the director is further configured to discover all other directors on the plurality of management servers.

7. The system according to claim 1, wherein the plurality of management servers each comprise a dedicated management interface providing unrestricted access to the distributed coordination service.

8. The system according to claim 1, wherein the plurality of management servers each comprise one or more client ports.

9. The system according to claim 8, wherein the director is further configured to:

issue certificates to any of the one or more nodes that desire to connect to any of the plurality of management servers; and grant access to certificate bearing nodes on the one or more client ports.

10. The system according to claim 1, wherein each of the plurality of management servers comprise a client forwarder that cooperates with the director to forward a known set of local ports and transparently handle encryption of traffic and automatically update the forwarded ports when any of the directors of the plurality of management servers are unavailable.

11. The system according to claim 1, wherein the director is further configured to implement a blueprinter that assigns each of the one or more nodes to at least one of the plurality of management servers based on a role associated with the one or more nodes.

12. The system according to claim 11, wherein the blueprinter is further configured to dynamically reassign a node of the one or more nodes when the role changes or a role of a currently assigned management server is changed.

13. The system according to claim 12, wherein the role is defined using a token, wherein the blueprinter cryptographically verifies that the token is valid and untampered.

14. The system according to claim 13, wherein the blueprinter is configured to ensure that automatically assigned management server relationships do not conflict with manually assigned management server relationships.

15. A method, comprising:

providing one or more nodes providing services; and maintaining a quorum of a plurality of management servers by:

providing at least a distributed coordination service for the one or more nodes on each of the plurality of management servers, the distributed coordination service including a datastore for configuring the services;

managing, via a director, requests for data on the distributed coordination service from the one or more nodes;

automatically and selectively promoting at least one of the one or more nodes to being one of the plurality of management servers based on a threshold of trust for the one or more nodes to maintain the quorum, wherein promoting comprises replicating the distributed coordination service and starting a new director on the at least one of the one or more nodes; and maintaining secure tunnels between the plurality of management servers and the one or more nodes providing services, the secure tunnels providing transparent encryption of traffic.

16. The method according to claim 15, further comprising:

receiving a request from at least one of the one or more nodes providing services to connect with the distributed coordination service; and connecting the at least one or more nodes to the distributed coordination service through a client forwarder.

17. The method according to claim 16, wherein the at least one of the one or more nodes that is promoted is the at least one or more nodes that has connected to the distributed coordination service through the client forwarder.

18. The method according to claim 15, wherein promoting further comprises writing distributed coordination service configuration files to the at least one of the one or more nodes in such a way that a uniqueness of an identification of the distributed coordination service is maintained.

* * * * *